(12) United States Patent
Prinsloo et al.

(10) Patent No.: US 11,487,536 B2
(45) Date of Patent: Nov. 1, 2022

(54) SYSTEM FOR AUTOMATING USER-DEFINED ACTIONS FOR APPLICATIONS EXECUTED USING VIRTUAL MACHINES IN A GUEST SYSTEM

(71) Applicant: AVEVA Software, LLC, Lake Forest, CA (US)

(72) Inventors: Johan Prinsloo, Fallbrook, CA (US); Geoffrey Tarcha, Solana Beach, CA (US); Roy Li, Yorba Linda, CA (US); Jagan Annamalai, Fulshear, TX (US); Chau Duong, Vista, CA (US); Andrew Goorchenko, Oceanside, CA (US); Marlina Lukman, San Diego, CA (US); Ian Willetts, Carlsbad, CA (US)

(73) Assignee: AVEVA Software, LLC, Lake Forest, CA (US)

( * ) Notice: Subject to any disclaimer, the term of this patent is extended or adjusted under 35 U.S.C. 154(b) by 0 days.

(21) Appl. No.: 16/727,083

(22) Filed: Dec. 26, 2019

(65) Prior Publication Data
US 2020/0133666 A1 Apr. 30, 2020

Related U.S. Application Data

(63) Continuation of application No. 15/385,171, filed on Dec. 20, 2016, now abandoned.

(51) Int. Cl.
*G06F 8/77* (2018.01)
*G06F 9/455* (2018.01)
(Continued)

(52) U.S. Cl.
CPC ............ *G06F 8/77* (2013.01); *G06F 8/61* (2013.01); *G06F 8/71* (2013.01); *G06F 9/455* (2013.01);
(Continued)

(58) Field of Classification Search
CPC ..... G06F 8/61; G06F 8/71; G06F 8/77; G06F 9/455; G06F 9/45545; G06F 9/45558; G06F 2009/45562; G06F 2009/4557
See application file for complete search history.

(56) References Cited

U.S. PATENT DOCUMENTS

| 5,729,746 A | 3/1998 | Leonard |
| 8,099,480 B1 * | 1/2012 | Muthusrinivasan ... G06Q 10/06 709/222 |

(Continued)

OTHER PUBLICATIONS

BEA "BEAAquaLogic Service Bus™ Using the AquaLogic Service Bus Console" version:2.6 Jan. 2007, pp. 1-265. (Year: 2007).*

(Continued)

*Primary Examiner* — Meng Ai T An
*Assistant Examiner* — Willy W Huaracha
(74) *Attorney, Agent, or Firm* — Greenberg Traurig, LLP

(57) ABSTRACT

A computer-implemented method or system is provided to automate actions for one or more applications executed via a platform using at least one virtual machine in a guest system. Each virtual machine includes a guest operating system, a guest agent and an application to be executed on the virtual machine. The method or system stores in a memory user-defined automation actions and causal relationships between the user-defined automation actions from which an automation graph is derived for the application to be executed on the virtual machine on the guest system; launches the guest system and the virtual machine via the platform; and executes the user-defined automation actions via the guest agent of the virtual machine according to the automation graph after the guest system and the virtual machine are launched.

16 Claims, 13 Drawing Sheets

(51) Int. Cl.
*G06F 8/71* (2018.01)
*G06F 8/61* (2018.01)

(52) U.S. Cl.
CPC ...... *G06F 9/45545* (2013.01); *G06F 9/45558* (2013.01); *G06F 2009/4557* (2013.01); *G06F 2009/45562* (2013.01)

(56) References Cited

U.S. PATENT DOCUMENTS

| | | | |
|---|---|---|---|
| 8,225,317 | B1 | 7/2012 | Ciueh et al. |
| 8,656,398 | B2* | 2/2014 | Alexander ............ G06F 9/5027 718/102 |
| 8,910,155 | B1 | 12/2014 | Sobel et al. |
| 9,003,402 | B1 | 4/2015 | Carbone et al. |
| 9,307,019 | B2* | 4/2016 | Manglik ............... G06F 9/5072 |
| 9,311,119 | B2 | 4/2016 | Shah |
| 10,210,074 | B1* | 2/2019 | Szerenyi ............. G06F 11/3664 |
| 2007/0021995 | A1 | 1/2007 | Toklu et al. |
| 2011/0173605 | A1* | 7/2011 | Bourne ..................... G06F 8/61 718/1 |
| 2012/0144489 | A1 | 6/2012 | Jarrett et al. |
| 2013/0191759 | A1 | 7/2013 | Bhogal et al. |
| 2013/0326505 | A1* | 12/2013 | Shah ........................ G06F 8/61 718/1 |
| 2014/0058871 | A1 | 2/2014 | Marr et al. |
| 2015/0304175 | A1 | 10/2015 | Maes et al. |
| 2015/0363181 | A1* | 12/2015 | Alberti ..................... G06F 8/61 717/177 |
| 2016/0004531 | A1* | 1/2016 | Stephens .................. G06F 8/60 717/103 |
| 2016/0004628 | A1* | 1/2016 | Gugri ................. G06F 11/3688 717/124 |
| 2017/0161043 | A1* | 6/2017 | Khazanchi .......... H04L 41/0246 |
| 2017/0199752 | A1* | 7/2017 | Cao .................... G06F 9/45558 |
| 2017/0371733 | A1* | 12/2017 | Rugina ................. G06F 11/073 |

OTHER PUBLICATIONS

M. Zaharia, et al., "Resilient Distributed Datasets: A Fault-Tolerant Abstraction for In-Memory Cluster Computing", NSDI, 2012.

* cited by examiner

800

USER INTERFACE

INPUT: 810

Name

Relationship
(e.g., Precursor(s))

Payload (e.g., Action)

[ CONTINUE ] [ END ]

820

```
{
 {"name":"a", "precursors":[], "payload":{"cmd":"println("a")"}},
 {"name":"b", "precursors":["a"], "payload":{"cmd":"println("b")"}},
 {"name":"c", "precursors":["a"], "payload":{"cmd":"println("c")"}},
 {"name":"d", "precursors":["b","c"], "payload":{"cmd":"println("d")"}},
 {"name":"e", "precursors":["d"], "payload":{"cmd":"println("e")"}}
}
```

[ EDIT ]

Fig. 8

SYSTEM FOR AUTOMATING USER-DEFINED ACTIONS FOR APPLICATIONS EXECUTED USING VIRTUAL MACHINES IN A GUEST SYSTEM

CROSS-REFERENCE RELATED APPLICATIONS

This application is a continuation of U.S. application Ser. No. 15/385,171, filed Dec. 20, 2016, entitled "Application Lifecycle Management System", now abandoned, all of which is hereby incorporated by reference for all purposes.

FIELD

The present disclosure is directed to a computerized method and system for automating actions specified by a user to configure and provision simple or complex applications in a well-defined and orchestrated sequence or a managed sequence of steps on a distributed system of virtual machines and networks in a cloud environment, and in addition, for enabling automated failure monitoring and mitigating actions specified by a user to be automatically performed in the event of a failure on the guest system.

BACKGROUND

Software-based services can be offered to users through the use of virtual machines provided on a cloud. A user through a web client can access the cloud via the Internet, and request these software-based services provided through the execution of an application(s) on a virtual machine(s). However, as applications become increasingly complex requiring more processing power and memory, it becomes more problematic when the components of such applications are distributed across different virtual machines in a guest system and/or a failure or other issues occur in the provision of these applications to a user. The configuration and launch of such complex distributed systems is quite involved; the virtual networks, virtual machines instances and the applications themselves needed to be correctly configured and launched in a precise and coordinated series of steps. An application failure or other failure may result in the termination of the application executing on virtual machine(s) of a guest system. In such a case, an administrator may need to expend significant resources, including time, to identify the causes for such a failure after the fact. Furthermore, the failure is not only frustrating to the end user, but may also result in the loss of productivity and data.

Accordingly, there is a need for a technical improvement to existing computer systems and technology that would provide a user with the flexibility to define and automate failure monitoring and mitigation for an application executed on virtual machine(s) of a guest system. There is also a need for a technical improvement to existing computer systems and technology that would allow a user to coordinate and control the timing of actions to be performed on different virtual machines that execute different applications or components thereof, such as on a distributed guest system. There is also a need for a technical improvement to existing computer systems and technology, which will provide a user with the flexibility of incorporating additional functionality and control across a lifecycle of an application(s) provided to one or more users through the cloud without having to directly modify or update the underlying application(s).

SUMMARY

To address these and other issues, a computerized method and system are provided which enable a user to define automation actions and causal relationships between the automation actions to derive an automation graph(s) associated with an execution of an application. When a guest system and its virtual machine(s) are launched to implement the application, the virtual machine is configured to automatically implement the actions defined or specified by the user (also referred to as "user-defined automation actions") via a guest agent on the virtual machine according to the automation graph over a lifecycle of the virtual machine of guest system. In this way, it is possible to automate various actions over a lifecycle of a virtual machine, such as automate application configuration, automate content load and application launches during startup, monitor or watch for specific failures and automate their mitigation, and automate content persistence during shutdown. Furthermore, it is possible to automate actions across different machines, such as in a distributed guest system, by providing synchronization barriers—where automation graphs on separate machines wait for each other before continuing, and by providing automated step-to-step messaging (e.g., a step on one machine can wait for a signal from another on a different machine).

In accordance with an exemplary embodiment, a computer-implemented method, computer system and a tangible memory medium with executable code are provided to automate actions for one or more applications executed via a platform using at least one virtual machine in a guest system. Each virtual machine includes a guest operating system, a guest agent and an application to be executed on the virtual machine. The computer-implemented method, computer system and tangible memory medium are configured to implement the operations of: storing in a memory user-defined automation actions and causal relationships between the user-defined automation actions from which an automation graph is derived for the application to be executed on the virtual machine on the guest system; launching the guest system and the virtual machine via the platform; and executing the user-defined automation actions via the guest agent of the virtual machine according to the automation graph after the guest system and the virtual machine are launched.

The platform can be implemented on a cloud computing architecture. The guest system and the virtual machine are launched by the platform in response to a request sent over the Internet (e.g., via a web browser). The platform can execute for the guest system the stages of Initialization, VM Launch, Configuration, Application Launch, Running, Reboot, Stop and Shutdown. The user-defined automation actions are executed by the guest agent in or over one or more of the stages of Configuration, Application Launch, Running, Reboot, Stop and Shutdown.

The automation graph can be a directed acyclic graph including a plurality of graph nodes having payloads that correspond to respective ones of the user-defined automation actions to be executed. The payloads of the graph nodes are executed in a sequential order according to the user-defined causal relationships. Furthermore, the plurality of graph nodes can include at least one conditional node having a plurality of direct predecessor nodes. The guest agent of the virtual machine executes a payload of the conditional node when execution of a payload of at least one of the plurality of direct predecessor graph nodes has been completed even if execution of one or more of the other direct predecessor graphical nodes has failed or is not completed.

The user-defined automation actions can have associated therewith two automation graphs to be executed on two different virtual machines. Each of the two automation graphs including a plurality of graph nodes with payloads corresponding to respective ones of the user-defined automation actions. The virtual machines execute the payloads of the graph nodes of the two automation graphs in synchronization with each other, such as through the use of step-by-step messaging therebetween.

The computer-implemented method, computer system and a tangible memory medium with executable code can further implement the operations of: providing a user interface for a user to input information corresponding to the user-defined automation actions and causal relationships; and deriving the automation graph based on the inputted user-defined automation actions and causal relationships. The inputted information can correspond to a graph adjacency list with a happens-before relationship and a payload for each automation action.

BRIEF DESCRIPTION OF THE FIGURES

FIG. 8 illustrates an example user interface through which a user can input and define automation actions and causal relationships from which an automation graph, such as a directed acyclic graph (DAG), of automation actions is derived (or constructed) for use in automating and controlling actions on a virtual machine of a guest system when launched to execute an application.

DISCUSSION OF EXAMPLE EMBODIMENTS

Figure 1:
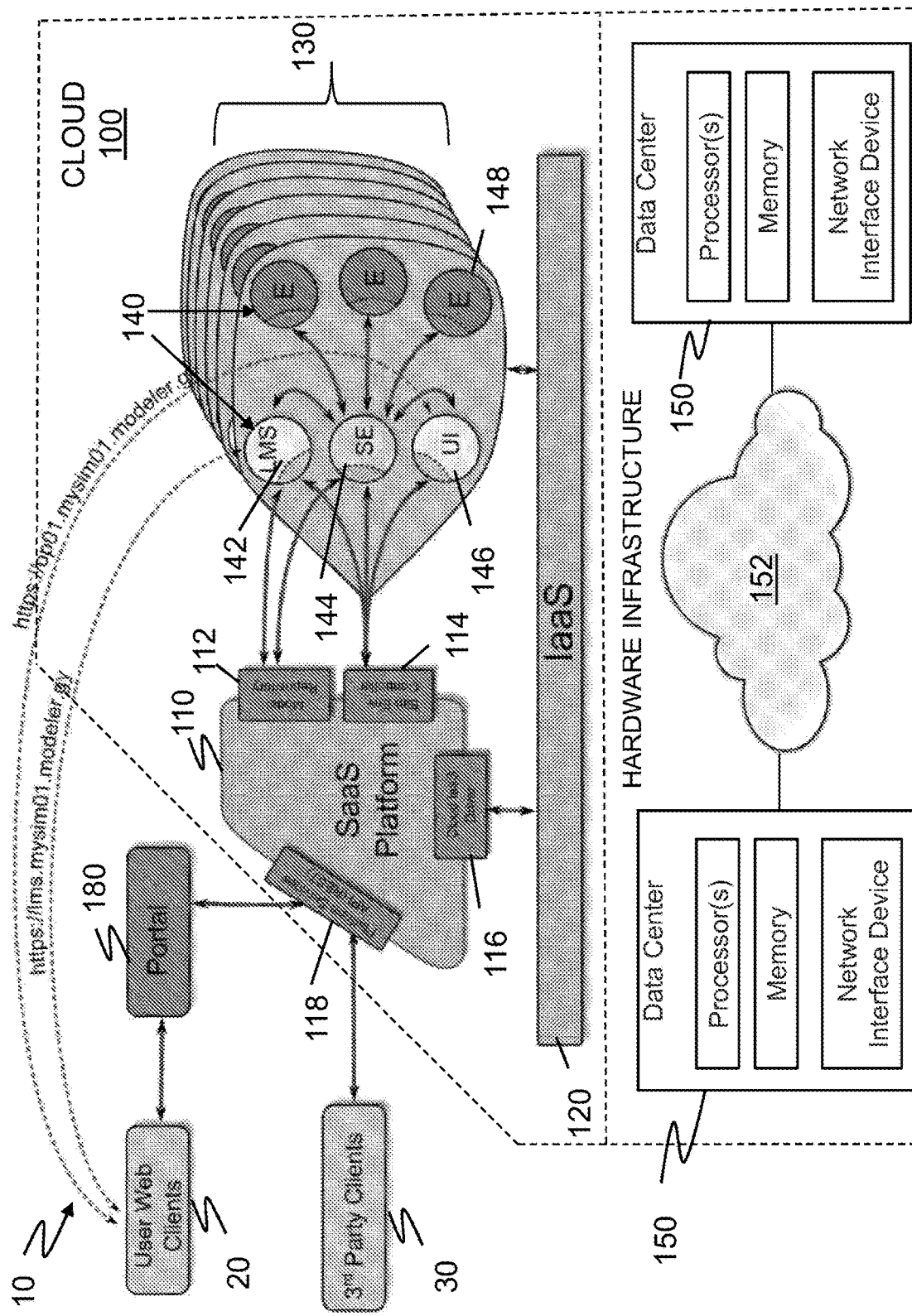
FIG. 1 illustrates an example cloud computing architecture in accordance with an embodiment of the present disclosure.

A computerized system and method are provided with a centralized automation system to address the technical problems of making existing application(s) execute on the cloud in a convenient and reliable manner. The centralized automation system, e.g., a platform on a cloud computing architecture, manages applications provided through a guest system and its virtual machine(s), such as a distributed guest system with one or more virtual machines. The guest system, in general, can contain multiple applications, such as from different vendors that need to be configured and integrated dynamically by the automation system. In a cloud computing architecture, the platform provisions systems for users on demand, and then allows users to use the applications (e.g., system applications) through a web browser. The applications and topology (number of sub-networks and virtual machines) are defined by users themselves. Application owners, who want to host their applications on the platform, configure the basic building blocks that users use in their system blueprints. These building blocks are "machine images" with the application software pre-installed, and "automation action steps" that allow the software to be configured and executed automatically. The computerized system and method provide a scheme used to define and then execute the automation action steps. The guest applications typically are fairly complex, such as for example distributed simulation environments. These applications can utilize many networked (clustered) machines to process large simulation models in real time. The method or system also provides the user with the flexibility to define and automate failure monitoring and mitigation for application(s) executed on the virtual machine(s) of a distributed guest system.

In accordance with the present disclosure, a user is provided with a user interface through which to configure automation actions for the application(s) in a declarative way for operation on a virtual machine of a guest system. Specifically, the user can define or state a set of automation actions and their causal relationships, e.g., "happens after" relationships, with each other. Thereafter, the automation system can automatically extract the maximum level of concurrency by deriving (or constructing) an automation graph. The automation graph can, for example, take the form of a Directed Acyclic Graph (DAG) representation of the interrelated automation actions. Once the automation actions are defined by a user for an application, the automation system, such as a platform (e.g., commercial off the shelf (COTS) Platform), can execute the actions specified by the user on a guest system every time a guest system and its virtual machine(s) are launched. The status and outcome of each automation action (also referred to as an "automation action step") is logged and reported to interested users. Automation actions are retried on failure.

The user-defined automation actions are managed centrally in the platform, and executed remotely on ephemeral cloud machines using a guest agent, e.g., a secure guest agent component, which is installed in each virtual machine image used by the guest system. Automation actions across different machines can be coordinated in two ways: (1) synchronization barriers—where automation graphs on separate machines wait for each other before continuing; and (2) automation step-to-step messaging (e.g., a step on one machine can wait for a signal from another on a different machine). The automation system is also active during the entire guest system lifecycle, such as follows: application configuration, content load and application launches are automated (during startup); the automation system monitors or watches for specific failures and automates their mitigation (during runtime); and the automation system automates content persistence (during shutdown). The above are a few non-limiting exemplary categories of user-defined automation actions and their relationships that can be defined by the user for an application, and are executed during a lifecycle of a guest system and its virtual machine(s) when executing the application or components thereof. Examples of such a computerized system and method are described in greater detailed below with reference to the figures, in accordance with various embodiments of the present disclosure.

A. Architecture

FIG. 1 illustrates an example of a cloud computing architecture 10 for providing cloud-based services to a user through the execution of an application using virtual systems or machines. The architecture 10 includes a user web client(s) 20, third party client(s) 30, and a cloud 100 through which the services are offered and provided to the user web client 20. The clients 20 and 30 can be implemented on a computer system(s) that includes a processor (e.g., CPU), memory to store applications and data, input device, output device, and network interface device (e.g., transmitter and receiver circuitry). The third party may interact with the cloud 100 as part of the provisioning of services to the user.

The cloud 100 includes a platform 110, which is a persistent distributed application. The user through the user web client(s) 20 can request and access the services and their applications on the cloud 100 via a portal 180, which, in this example, is a thin web application that allows online user access to the platform 110. The platform 110 is a web services application that has as one of its primary functions to provision guest systems 130, using API calls to the cloud 100 Infrastructure-as-a-Service 120 (IaaS) providers, via cloud driver 116. The platform 110 can include a central content store for storage and revision control, storage for metadata, storage for reusable software (e.g., system application(s)), and storage for guest agent software. When launched, each guest system 130 can include one or more virtual machines 140 which execute application(s) or components thereof to provide the requested services to the user. The guest systems 130 can be defined by users using blue prints (templates), and are instantiated by the platform 110 using the topology and virtual machine images specified in the blueprints. The guest systems 130 are ephemeral, meaning that the platform 110 provisions and manages them on demand.

The platform 110 may run on data centers 150 in the cloud 100, and manages all states in the architecture 10. The data centers 150 may be connected across a network(s) 152, and include at least a processor(s) (e.g., CPUs), memory, and network interface device(s). The platform 110 functions include:

Provisioning virtual networks and guest systems 130 and virtual machines 140, and launching guest applications and guest agents in guest systems 130, which may be configured in a runtime template;

Monitoring guest applications and dealing with their failures;

Managing user, user group, and resource authorization;

Building and updating machine images as a background task, from recipes as defined by application role definitions;

Providing a software application through which users can specify automation actions and their causal relationships to derive automation graph(s) through which a guest agent on a virtual machine 140 (of a guest system 130), when launched to execute a guest application, automates and controls these actions over the lifecycle of the guest application, virtual machine 140 or guest system 130; and Facilitating messaging (e.g., step-by-step messaging) between virtual machines 140 in the same guest system 130 and/or in different guest systems 130.

When the data center(s) 150 executes via its processor(s) the concurrent and distributed platform application stored in the memory, the processor and memory of the data center(s) 150 perform the method of virtual machine image storage, of runtime provisioning including the implementation of user-defined automation actions via a guest agent, and of other functions, operations or steps described herein in accordance with the various embodiments of the present disclosure.

In this example, the platform 110 is a Simulation-as-a-Service cloud platform that provisions simulation systems on the cloud 100 on demand, and includes a Model Repository 112 and a Simulation Environment Controller 114 which interacts with the application(s) or components thereof on the virtual machines 140 of the guest systems 130 to provide simulation services to users. The platform 110 further includes a platform application program interface (API) 118 through which the user web clients 20 can access the platform 110 via the portal 180. The guest systems 130, in this example, implement on or across one or more virtual machines a dynamic simulation (DYNSIM) application, which includes a Learning Management System node (LMS) 142, DYNSIM SimExecutive Node (SE) 144, InTouch HMI Node (UI) 146, and three Calculation Engines (E) 148 (also referred to as guest simulation cluster). The user may access the virtual machine(s) 140 of the guest system 130 via a remote desktop session to run, for example, a design process for a steam control system in a petroleum refinery. The user can access the LMS 142 as a website, and the UI 146 as a HTML5 remote desktop session.

The Infrastructure-as-a-Service (IaaS) 120 of the architecture 10 is a network utility program for accessing, monitoring, and managing infrastructures of the data centers 150 in the cloud 100, to perform functions such as compute (virtualized or bare metal), storage, networking, and networking services (e.g. firewalls).

Figure 2:
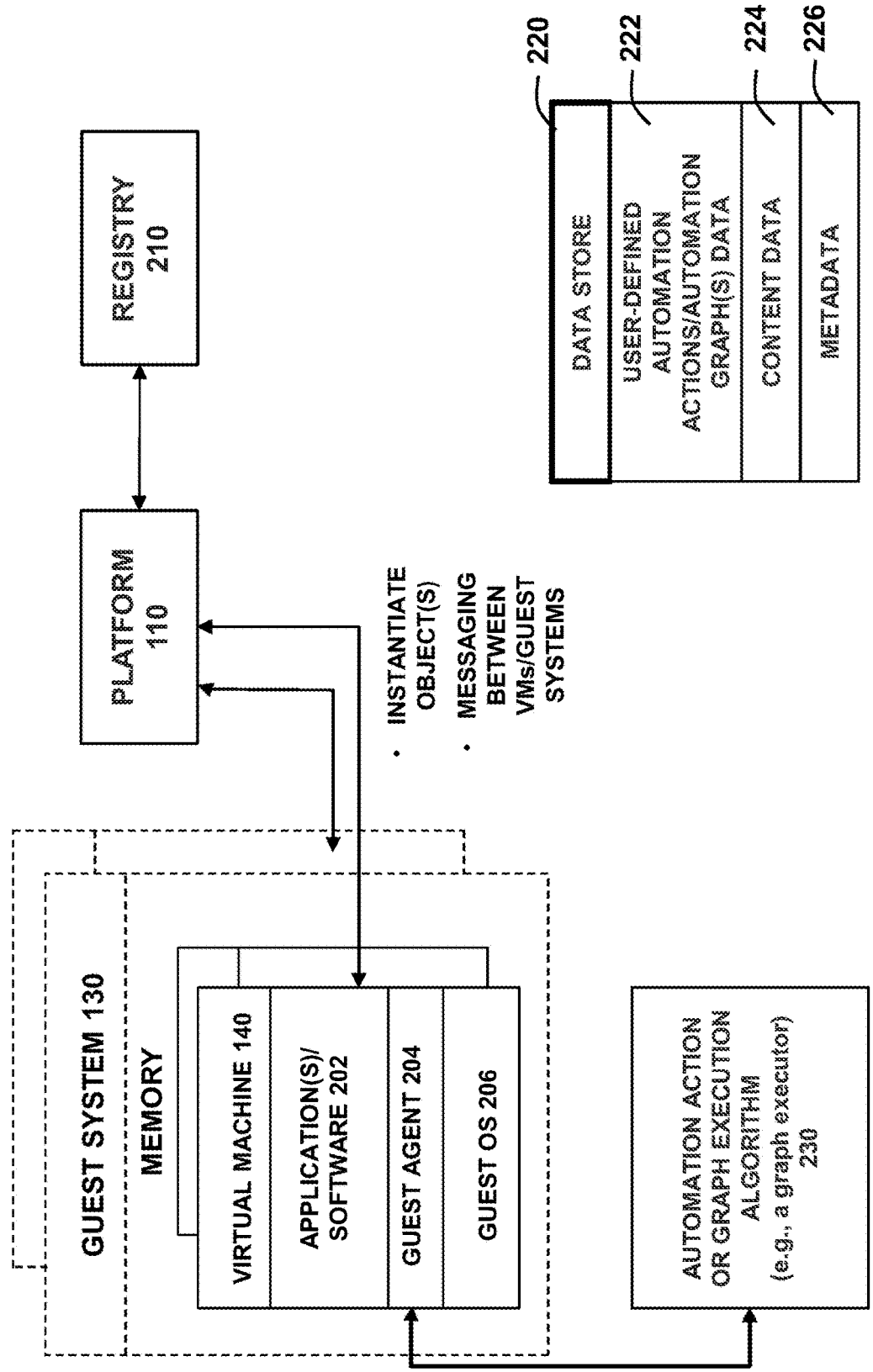
FIG. 2 illustrates an example of a platform instantiating a guest system with virtual machine(s) having a guest agent that executes user-defined automation actions during the life cycle of the guest system, in accordance with an embodiment of the present disclosure.

FIG. 2 illustrates an example of the platform 110 instantiating a virtual machine 140 in the guest system 130, which includes virtual machine executable application (or software) 202, a guest agent 204, and a guest operating system (OS) 206. The concurrent and distributed platform 110 application is currently being executed in a particular one of the cloud data centers 150 of FIG. 1, and thus, the memory of the data center 150 currently includes the virtual machine executable application 202, in accordance with exemplary embodiments of the present disclosure. The platform 110 enables inter-process communication and dynamic object creation in the guest system 130. The platform 110 instantiates the virtual machine 140 in the guest system 130. The guest agent 204 automatically executes actions defined by a user at one or more stages over the lifecycle of the application 202 or the virtual machine 140 of the guest system 130 according to user-defined automation actions or the corresponding automation graph(s) using an algorithm 230. The guest agent 204 applies the automation action step as specified by the user according to an automation graph or the like, and returns the results to the platform driver (e.g., 116 in FIG. 1). The platform driver runs through the automation sequence until complete or a fatal failure occurs. The guest OS 206 is an operating system capable of being executed in the guest system 130, and which supports the virtual machine executable application 202, and the guest agent 204.

The platform 106 includes a data store 220, which stores and maintains user-defined automation actions/automation graph(s) data 222, content data 224 (e.g., project specific content), metadata 226 (e.g., a URL to the content data 224 or specific content in the content data 224, or to other data maintained on the platform 110) and other data, which are used by the guest system 130 to provide requested services to the user. The user-defined automation actions/automation graph(s) data 222 includes information corresponding to the user-defined automation actions (e.g., a payload) and their causal relationship to each other (e.g., predecessor, descendent, etc.) and/or derived automation graph(s), and are used to initiate and control the automation of actions (as specified by the user) in the guest system 130, when the guest system 130 and its virtual machine 140 is launched. The automation graph can take the form of a directed acyclic graph (DAG).

Examples of the virtual machine executable application 202 may include an executable software program that provides a service to the user, such as, in this example, a dynamic process simulation. A first example project-specific function to which the executable application 202 may be applied may be a project to design a process for a steam control system in a petroleum refinery. Example content data 224 may include data required to design a process for a steam control system, such as for example, steam source data, valve data, piping data, and the like. It should be understood that the application 202 may provide other types of services or functions to a user.

When the platform 110 creates the virtual machine 140, it records information about the virtual machine 140 in a registry 210, which is a database that stores information, such as the virtual machine identifier and address, and reference identities of other objects that reference the virtual machine 140. The reference identities in the registry enable other application program(s), in response to an application request, to locate the virtual machine 140.

Figure 3:
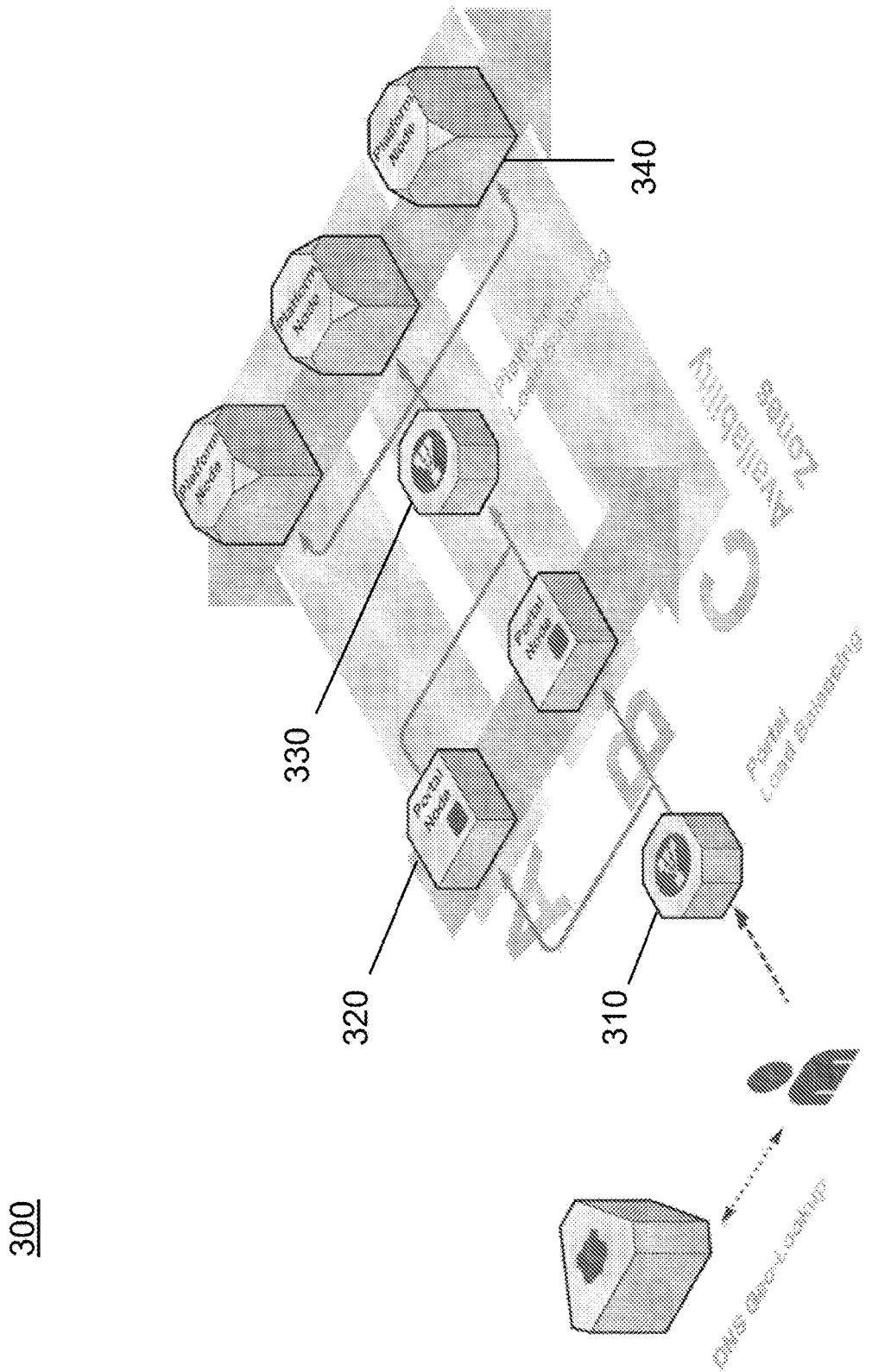
FIGS. 3-6 illustrate functional step-by-step diagrams of an example cloud deployment of a service requested by a user through a web client.
Figure 4:
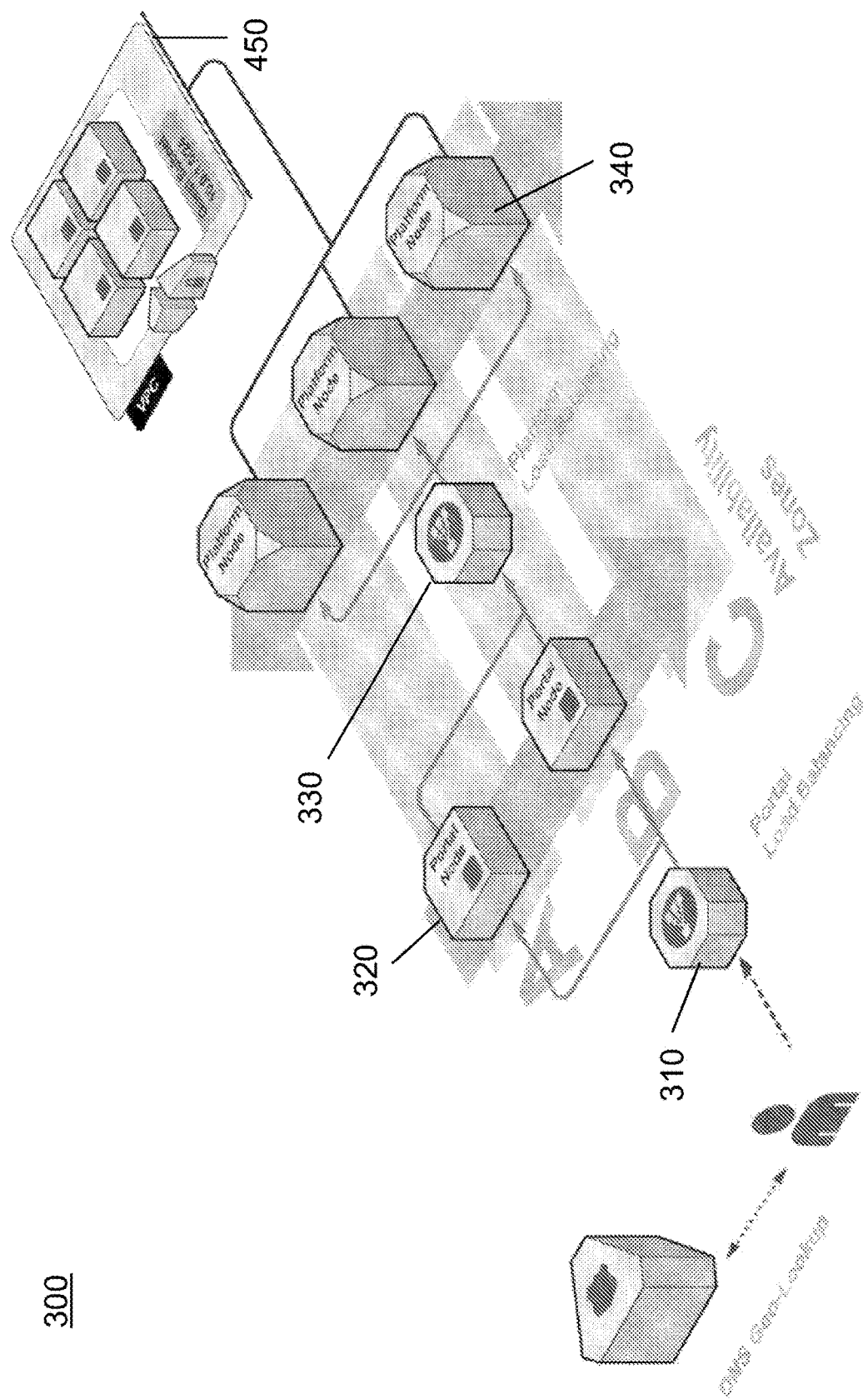
Figure 5:
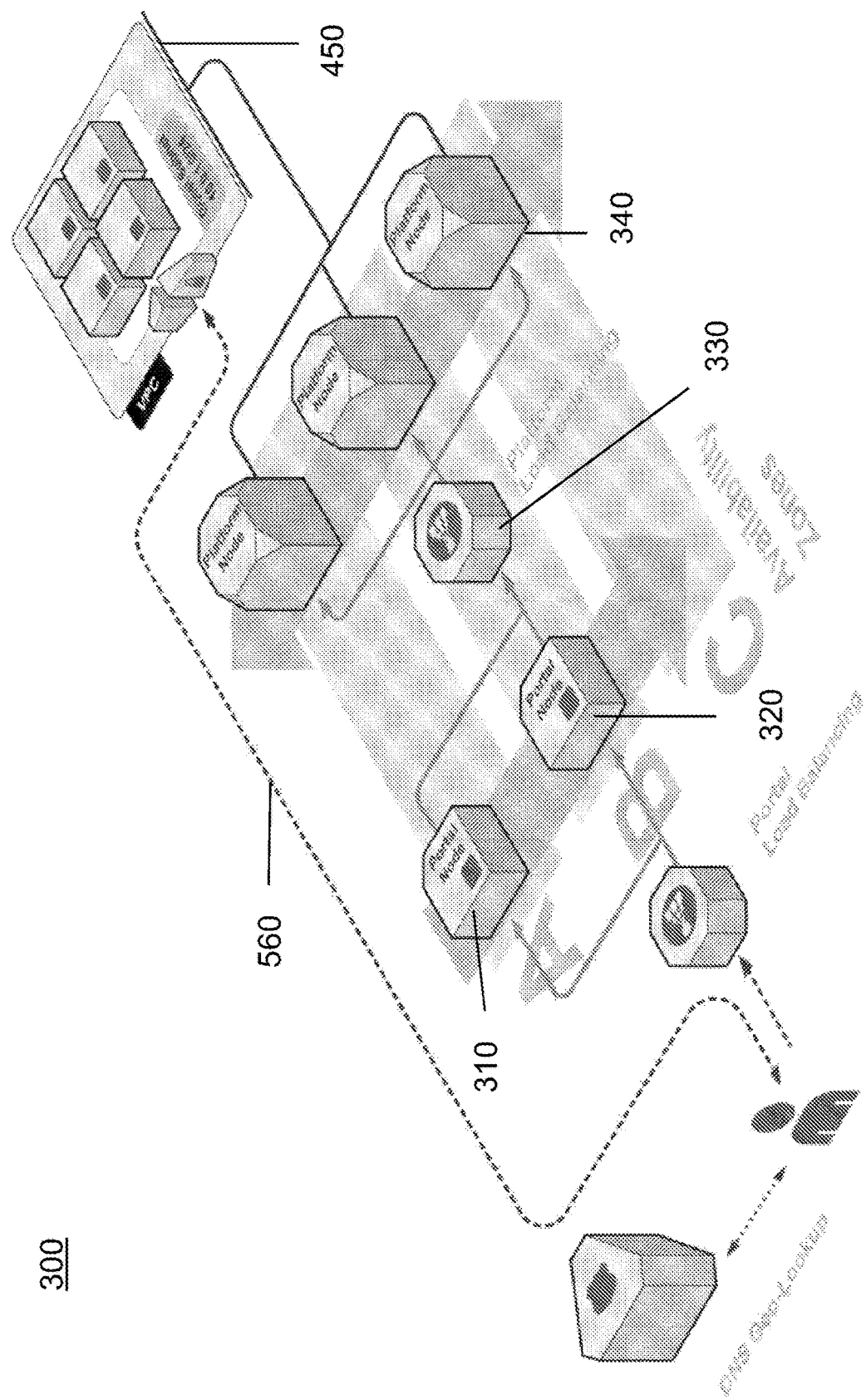
Figure 6:
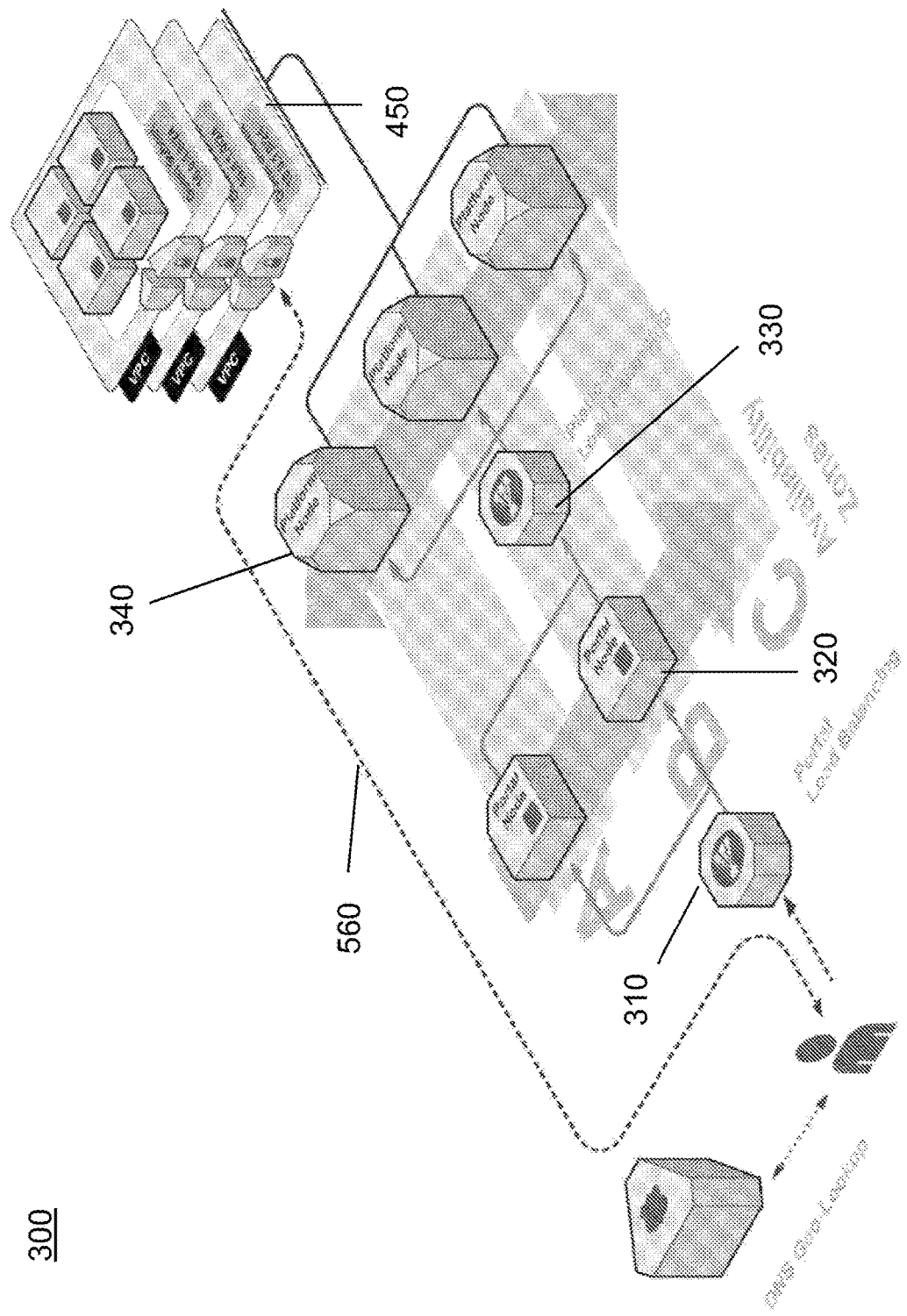

FIGS. 3-6 illustrate high level diagrams of the operations in an example deployment of a service requested by a user, such as through the user web client 20 of FIG. 1. In FIG. 3, a high level cloud-based architecture 300 is shown of nodes 320 of the portal (e.g., 180 in FIG. 1) and nodes 340 of the platform (e.g., 110 of FIG. 1), which is in an always-on and ready state to receive a request, e.g., a launch command, from a user via a web client to initiate service on the cloud. In the architecture 300, load balancing 310 is performed across the portal nodes 320, and platform balancing 330 is performed across the platform nodes 340. As shown in FIG. 4, the user via the user web client logs onto the portal through an available portal node 320, and sends a request to an available platform node 340 to launch a guest system 450 on the cloud. As shown in FIG. 5, the guest system 450 is provisioned by the platform node 340, and a custom URL 560 is created for the user's application(s). As previously described, a guest system can include virtual machine(s) with guest agent that is configured to implement user-defined automation actions over the lifecycle of the user's application(s) or virtual machine according to an automation graph derived from automation actions and their causal relationships as defined by a user. As shown in FIG. 6, the platform node 340 continues to provision many guest systems 450 on the cloud. The user can terminate the session, as desired, to terminate the guest system(s) 450.

B. Guest System Lifecycle

Figure 7:
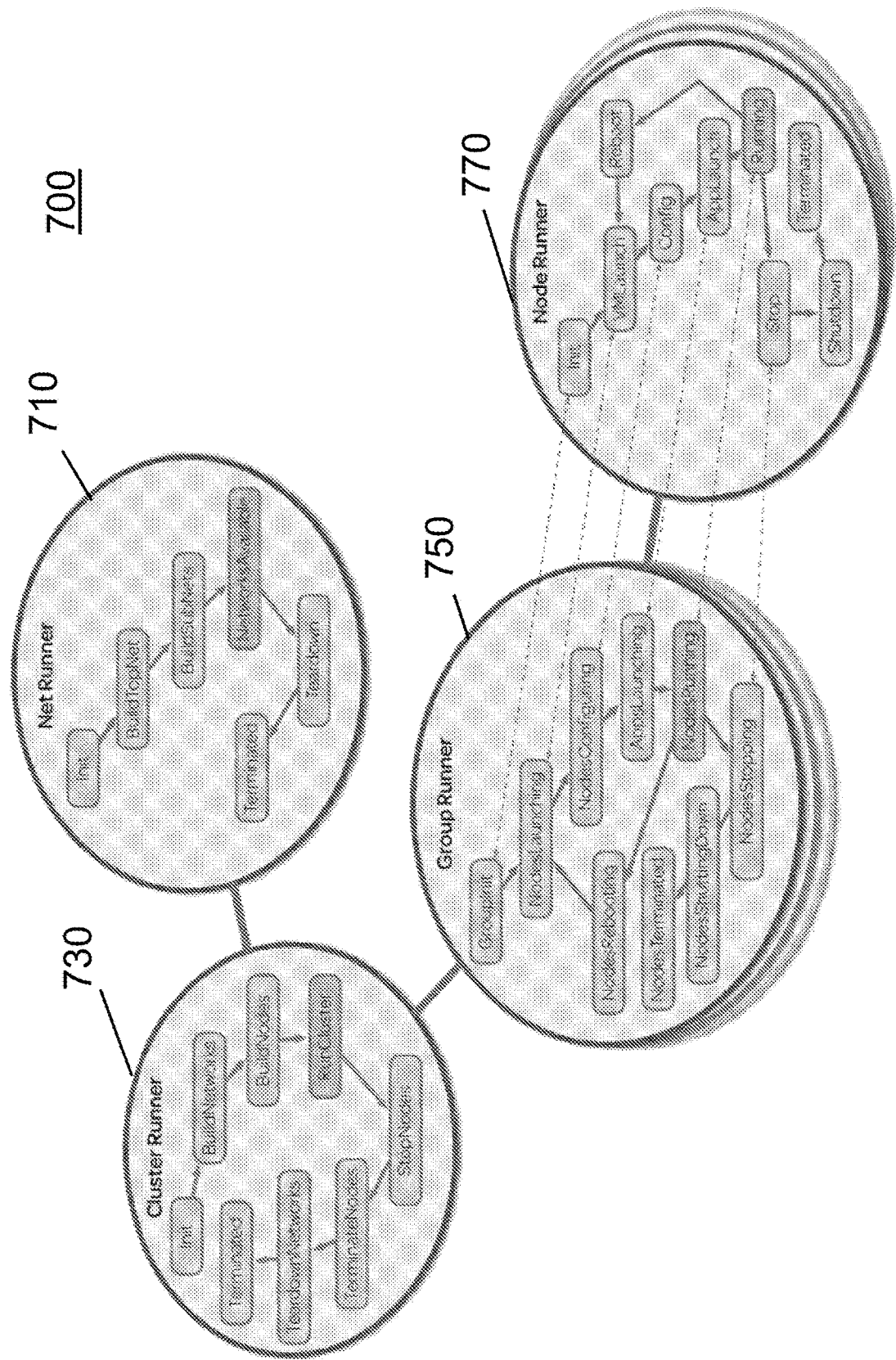
FIG. 7 illustrates a high level diagram of an example of a guest system lifecycle.

FIG. 7 illustrates a high level diagram 700 of an example of a guest system lifecycle. The automation system of the present disclosure works within the guest system lifecycle. Users can define automation actions and their causal relationships to derive a corresponding automation graph(s) that is triggered and executed by the platform at any or each stage of the lifecycle using a guest agent in the virtual machine of the guest system. As shown in FIG. 7, an example lifecycle may involve processes or services, such as Net Runner 710, Cluster Runner 730, Group Runner 750 and Node Runner 770. In this example, the Net Runner 710 is at the stage NetworksAvailable, the Cluster Runner 730 is at the stage RunCluster, the Group Runner 730 is at the stage NodeRunning, and the Node Runner 770 is at the stage Running.

Guest system nodes (e.g., virtual machines), as shown in the Node Runner 770, can go through the following high-level lifecycle stages:
1. Initialization (Init)
2. Virtual Machine (VM) Launch
3. Configuration (Config)
4. Application (App) Launch
5. Running
6. Reboot
7. Stop
8. Shutdown Accordingly, the automation system of the present disclosure allows a user to define and automate desired actions to be performed during one or more stages in a lifecycle of the guest systems, e.g., stages 3 through 8 such as after VM Launch.

C. User Defined Automation Actions/Graphs

FIG. 8 illustrates an example of a user interface 800 through which a user can input and define automation actions and causal relationships between the actions from which an automation graph is derived. The automation graph can be used to automate and control actions (e.g., operations, functions, etc.) in a guest system when a virtual machine is launched to execute the application on the machine. The user interface 800 can receive user input via an input area 810, such as (i) Name of the Action, (ii) Relationship to other actions (e.g., precursor or preceding action, descending action, or other causal relationships), and (iii) Payload indicating the automation action to be taken. The input area 810 may include graphical elements (e.g., graphical input box(es), pulldown boxes, etc.) through which a user can define automation actions and causal relationships therebetween to derive an automation graph. A user can input and define an automation action and their relationship to other actions one at a time by continuing the input process via the command CONTINUE or the like.

Figure 9:
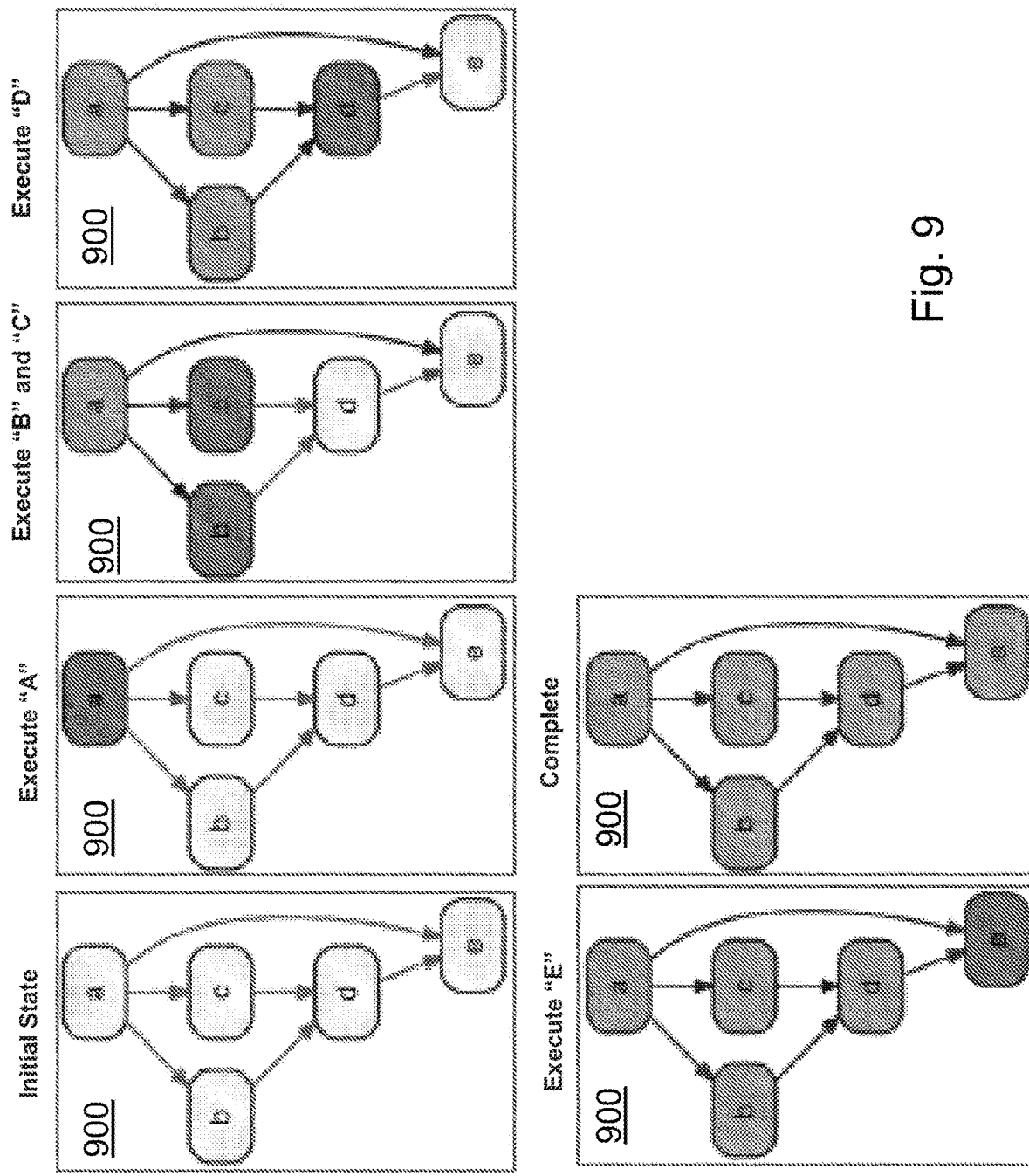
FIG. 9 illustrates a simple example of a directed acyclic graph of automation actions with five steps.

By way of example, the user interface 800 can also include a viewing area 820 which shows a set of automation actions and causal relationships between actions defined by a user. In this example, the user-defined automation actions can be defined in JavaScript Object Notation (JSON), and correspond to the example of a simple five-step automation graph 900 which is shown in FIG. 9. The automation graph in FIG. 9 includes action steps represented by graph nodes "a", "b", "c", "d" and "e" as shown in the Initial State. During operation, the action step "a" is first executed. The actions steps "b" and "c" are then executed in parallel. Next, the action step "d" is executed, which is followed by the execution of action step "e" which completes the automation graph. The viewing area 820 may concurrently or separately display the user-defined automation actions in graphical form (e.g., FIG. 9). The user can also edit the automation graph or particular steps via an EDIT command, which can allow the user to directly or to indirectly (e.g., through another window or interface) edit information in the viewing area 820.

Accordingly, the automation system of the present disclosure is able to provide various technical improvements to existing computer systems and technology, such as: (1) central, failure tolerant, management of distributed, coordinated automation; (2) a simple user interface for writing complex automation that is executed across clusters of machines; and (3) maximum concurrency, derived automatically by the automation system.

The user can define automation graphs that trigger, for example, in stages 3-8 (e.g., config, app launch, . . . shutdown of FIG. 7) of the lifecycle of a guest system. The platform executes the automation graph sequence centrally in the platform itself. The automation graph steps are executed on each guest system node with the help of a pre-installed guest agent. The guest agent applies the automation action step, and returns the results to the platform driver. The platform driver runs through the automation sequence until complete or a fatal failure occurs.

The automation graph can be a directed acyclic graph (DAG) of individual automation action steps. Such a graph is straightforward for the user to construct, by specifying, for example, "happens-before" relationships (e.g., precursor causal relationships) between individual automation action steps. Thus, a user interface can be provided which allows a user to define automation action steps and their causal relationships to each other to construct automation graphs without requiring substantial computer programming knowledge or skills. The user can define automation action steps and (i) their causal relationships to each other within an automation graph associated with an application or (ii) their causal relationships to each other between automation graphs for different applications or application components. The user can construct automation graph(s) to perform automation actions at any desired stage in the lifecycle of the guest system, after the guest system and its virtual machine(s) are launched. Non-limiting examples of automation action steps (e.g., actions) include:

Write a configuration file,
Replace certain registry keys,
Read configuration files and replace certain variables,
Clone content from a remote content store,
Launch a program,
Restart a service,
Watch a file, or
Other passive actions (e.g., monitoring) or active actions.

After the user defines the causal relationships between the automation action steps, the platform is configured to extract the maximum parallelism from the graph, and execute it on the guest systems via a guest agent.

Figure 10A:
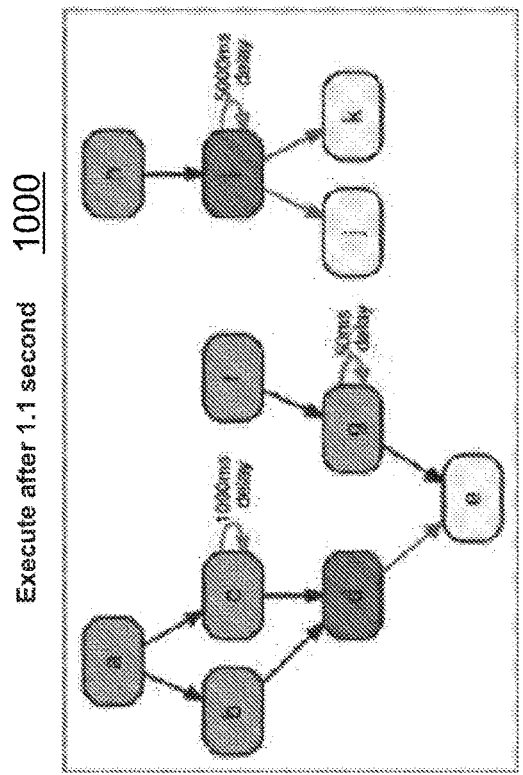
FIGS. 10A and 10B illustrate an example of a directed acyclic graph of automation actions with long running steps.
Figure 10B:
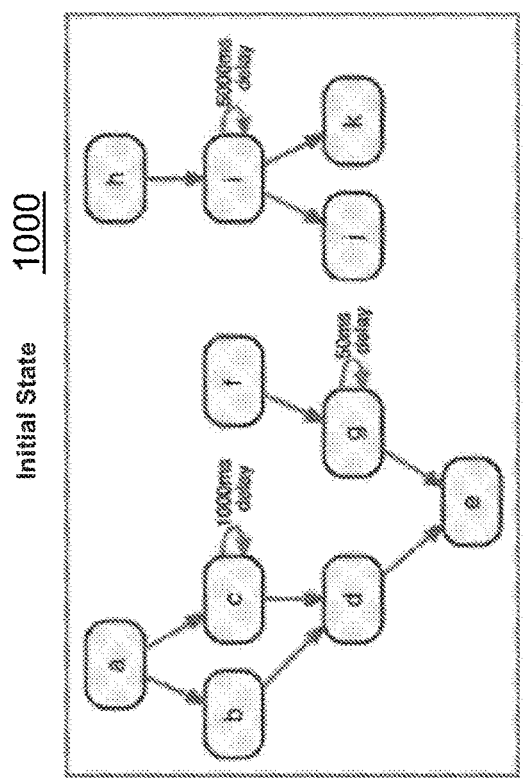

FIGS. 10A and 10B illustrate an example of automation graph(s) 1000 with automation actions having long running action steps in an initial state and an execution state after 1.1 seconds, respectively. The graph 1000 includes a first automation subgraph with the action steps represented by graph nodes "a", "b", "c", "d", "e", "f" and "g", and a second automation subgraph with the action steps represented by nodes "h", "i", "j" and "k". The step "c" has a 1000 ms delay. The step "g" has a 50 ms delay. The step "i" has a 5000 ms delay. The execution follows the graph flow, namely that a node only executes its payload when all of its precursors have successfully completed. As shown in FIG. 10B, after 1.1 seconds, the action steps "d" and "i" are still executing in the guest system, and the action step "g" has completed execution in the guest system. The action step "e", with the precursors "d" and "g", is still waiting to execute; and the action steps "j" and "k", with the precursor "i", are still waiting to execute.

The two separate automation subgraphs in FIG. 10A may be implemented on the same or different virtual machines in the guest system, and may execute in synchronization. That is, the two automation graphs on separate machines can wait for each other before continuing their execution. To synchronize the execution of the automation graphs on different virtual machines, the guest agent of the virtual machines can communicate with each other via step-to-step messaging reflecting the execution state of their respective automation graphs. For example, an action step on one virtual machine can wait for a signal from another action step on a different machine before continuing.

Figure 11:
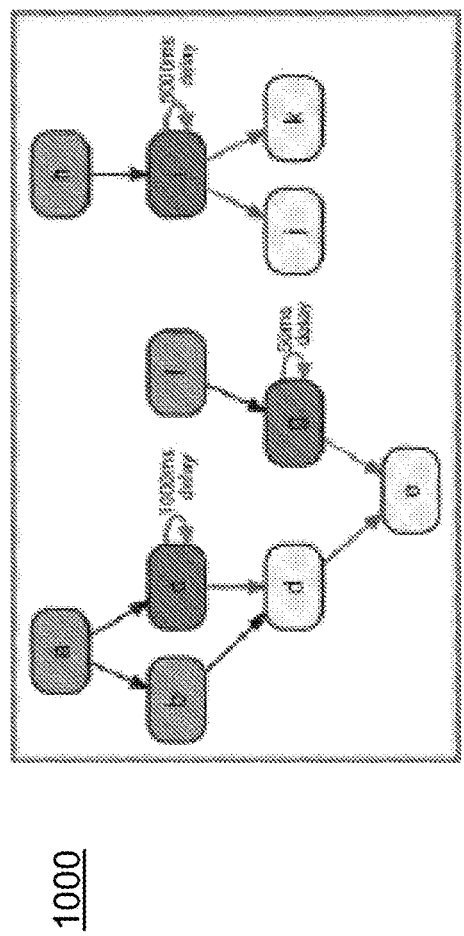
FIG. 11 illustrates an example of a directed acyclic graph of automation actions with a "reluctant" node to address the situation in which a fatal failure occurs in the guest system.

FIG. 11 illustrates an example using the automation graph(s) 1000 in FIG. 10A to show the situation in which a fatal failure occurs in the guest system. In operation, a guest agent, which executes the action steps in the automation graph, is configured to sense and handle fatal errors during execution. In this example, a fatal failure is recognized and declared at the action step "g". Any automation action step's logic can declare a fatal failure. When a fatal failure is declared, the graph executor application or software on the guest agent stops execution for all nodes of the automation graph, and raises the event to the platform.

D. Conditional Automation Graph Nodes

In most practical applications, there is a need to model cases where parts of an automation graph are executed conditionally. Graph nodes can be configured to conditionally pass on normal "action" execution messages or "no-action" messages. Down-stream nodes will then skip execution when they receive no-action inputs, and pass the no-action messages on to downstream nodes. This allows decisions to be made by the nodes at runtime. For instance, nodes can measure conditions and decide to cause skipped execution downstream. Automation graphs can be configured to make runtime decisions. The automation graph will still complete execution, even though some graph nodes did not execute. Accordingly, downstream nodes of an automation graph can be configured to react in one of two ways to action inputs: (1) as a "reluctant" node that is reluctant to execute, meaning that any no-action input signal will cause a node to skip execution, or (2) as an "eager" node that is eager to execute, meaning that the node will execute its payload when any input signal is an action. Examples of these types of node configurations are described below with reference to FIGS. 12 and 13.

Figure 12:
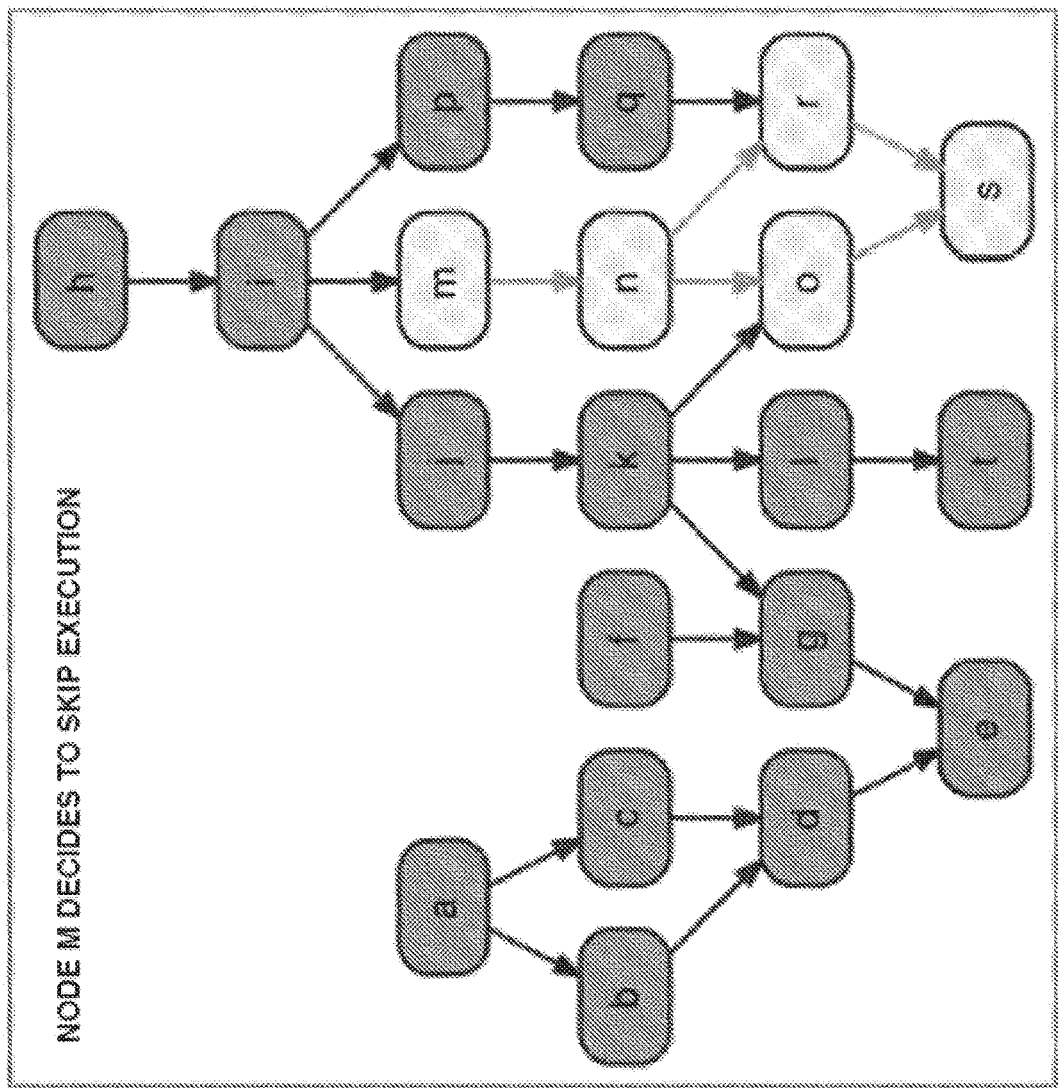
FIG. 12 illustrates an example of a directed acyclic graph of automation actions with condition execution.

FIG. 12 illustrates an example of an automation graph 1200 of automation actions with conditional execution. The graph 1200 includes action steps represented by graph nodes "a" through "s". In this example, the graph, node "m" logic decides to skip its own and downstream node execution. The downstream nodes react to either a "no-action" or "action" signal. In the following example, node "m" is configured to skip execution, and passes on no-action signals. All nodes are reluctant to execute in the graph 1200.

Figure 13:
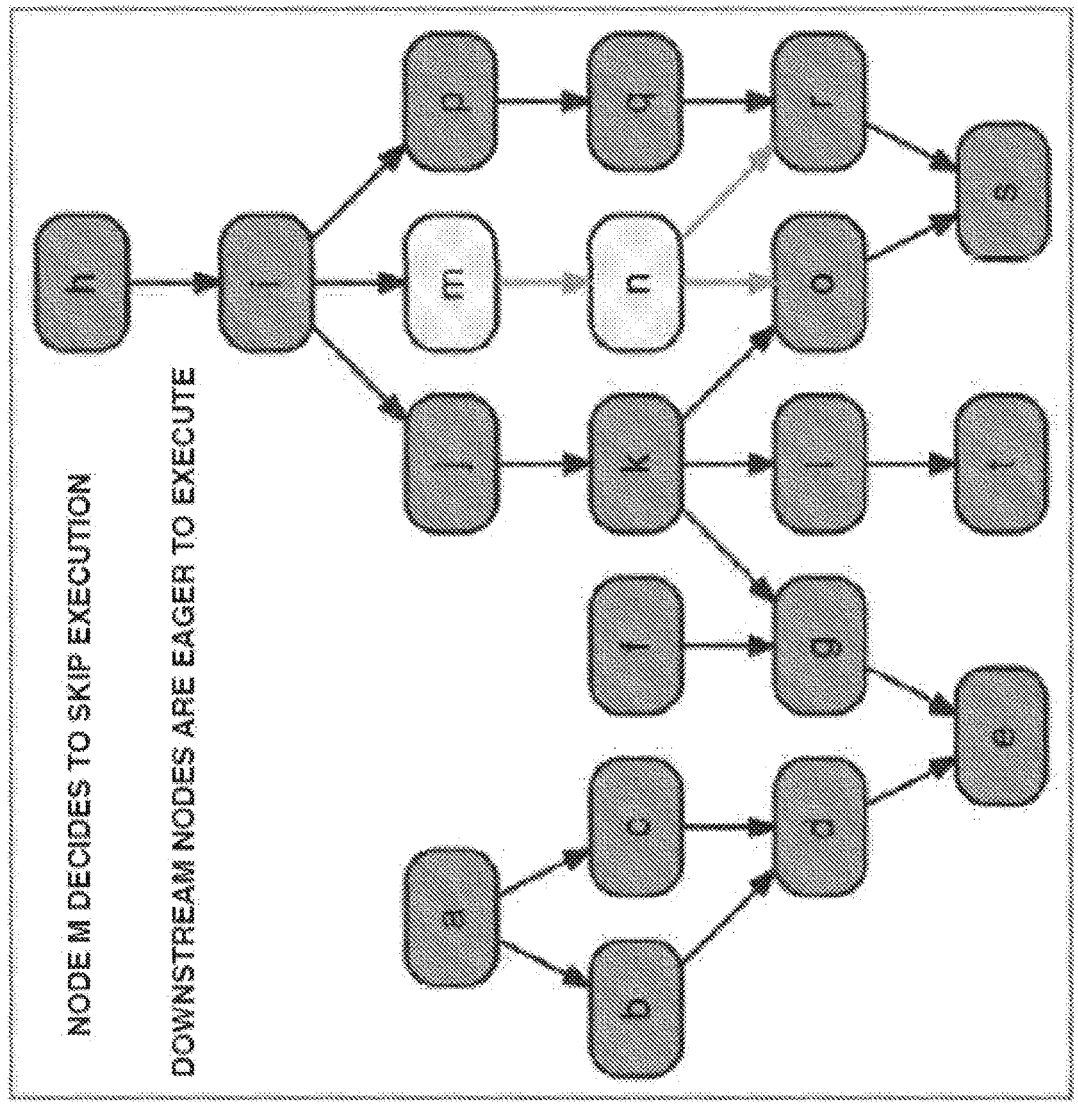
FIG. 13 illustrates an example of a directed acyclic graph of automation actions with "eager nodes" that may be used to mitigate the situation in which a non-fatal failure occurs on the application, virtual machine, or guest system.

FIG. 13 illustrates an example of an automation graph 1300 with "eager" nodes that may be used to mitigate the situation in which a non-fatal failure occurs in the guest system. As with the graph 1200 in FIG. 12, the graph 1300 includes action steps represented by graph nodes "a" through "s". In this example, the graph node "m" is again configured to simulate skipped execution. The graph nodes "o" and "r" execute eagerly because they receive at least one action signal. Accordingly, the user can continue to implement automation actions according to the automation graph in the event of "non-fatal" failures on the guest system.

E. Example Process

Figure 14:
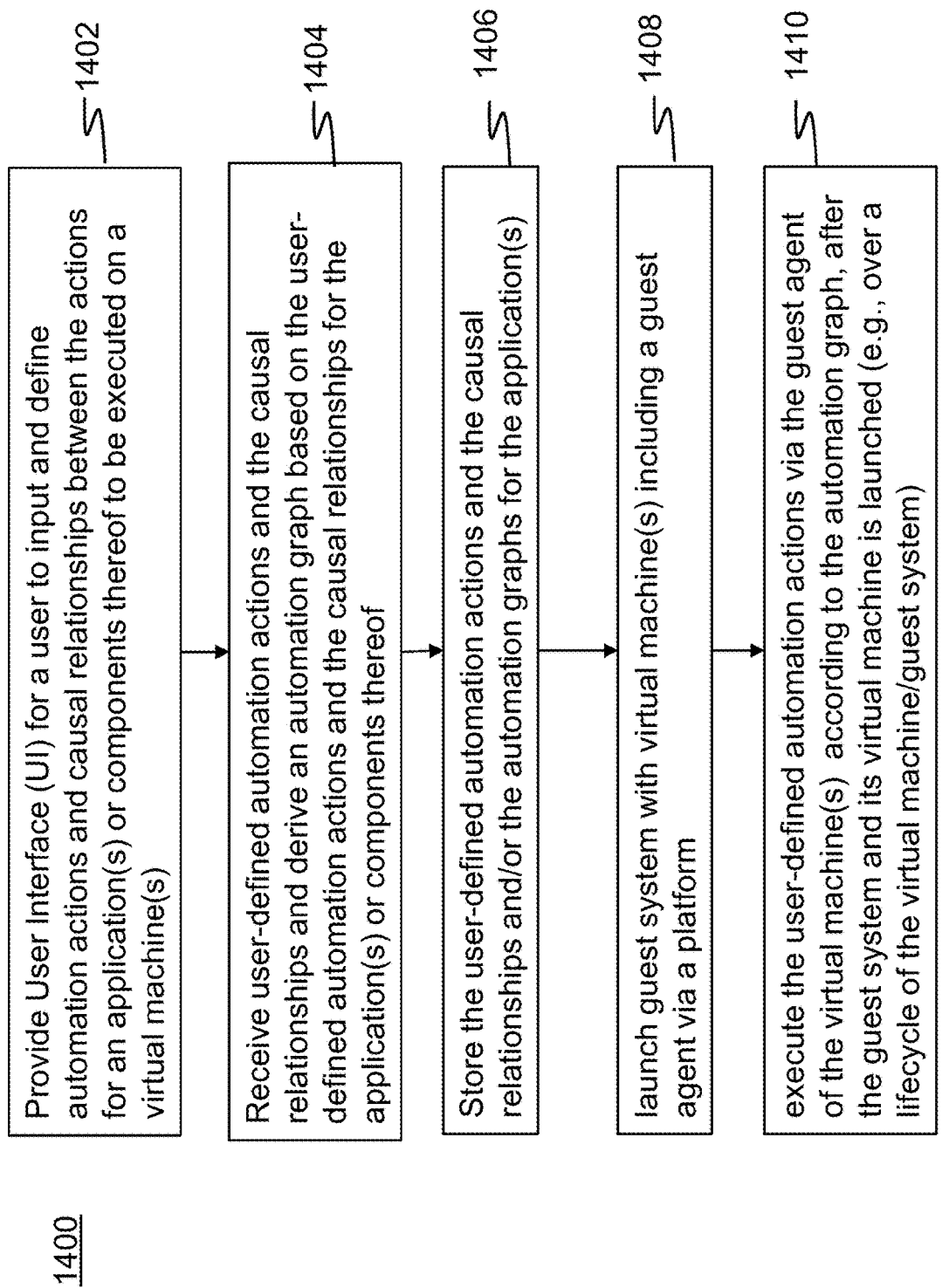
FIG. 14 illustrates a process by which automation actions and their causal relationships are defined by a user to derive an automation graph associated with an execution of an application, and implemented by a guest agent when a guest system and its virtual machine(s) are launched to execute the application or the application components.

FIG. 14 illustrates a process 1400 by which automation actions and causal relationships between each other are defined by a user to derive an automation graph, and implemented on a guest system executing one or more applications or components thereof through virtual machine(s), in accordance with an embodiment of the present disclosure. The process 1400 can be implemented on a platform on the cloud using data centers, such as in the example system architecture 10 of FIGS. 1 and 2.

At step 1402, a user interface (UI) is provided by the platform for a user to input and define automation actions and causal relationships between each other for an application(s) or components thereof to be executed on a virtual machine(s). The user interface can be provided as a web service or application to a user.

At step 1404, the platform receives the user-defined automation actions and causal relationships, and derives (or constructs) an automation graph for the application(s) or components thereof.

At step 1406, the user-defined automation actions and the causal relationships and/or the automation graph are stored in relations to the application(s) or components thereof.

At step 1408, the platform launches a guest system with a virtual machine(s) including a guest agent and the application.

At step 1410, the guest agent executes the user-defined automation actions in the virtual machine(s) according to the automation graph, after the guest system and the virtual machine is launched (e.g., over a lifecycle of the virtual machine/guest system). If the guest system is a distributed guest system with a plurality of virtual machines, the virtual machines may be configured to communicate with each other on a step-by-step basis while implementing their respective automation graphs through their guest agents so that automation actions can be implemented in a synchronized manner. Likewise, step-by-step messaging can also be performed between virtual machines on different guest systems to implement their respective automation graphs in a synchronized manner.

It should be understood that systems and methods described above are provided as an example. The automation system can be implemented on any suitable networked computer system or architecture other than a cloud-based one which uses virtualization to provide application-based services to a user or other entity.

It will be appreciated that the development of an actual, real commercial application incorporating aspects of the disclosed embodiments will require many implementation specific decisions to achieve the developer's ultimate goal for the commercial embodiment. Such implementation specific decisions may include, and likely are not limited to, compliance with system related, business related, government related and other constraints, which may vary by specific implementation, location and from time to time. While a developer's efforts might be complex and time consuming in an absolute sense, such efforts would nevertheless be a routine undertaking for those of skill in this art having the benefit of this disclosure.

It should also be understood that the embodiments disclosed and taught herein are susceptible to numerous and various modifications and alternative forms. Thus, the use of a singular term, such as, but not limited to, "a" and the like, is not intended as limiting of the number of items.

Although specific example embodiments of the invention have been disclosed, persons of skill in the art will appreciate that changes may be made to the details described for the specific example embodiments, without departing from the spirit and the scope of the invention.

The invention claimed is:

1. A system for managing applications comprising:
one or more computers comprising one or more processors and one or more tangible computer readable media, the one or more tangible computer readable media including instructions stored thereon that when executed cause the one or more computers to:
implement, by the one or more processors, a software application configured to enable a user to specify one or more automation actions and causal relationships related to the one or more automation actions from which an automation graph including a first automation subgraph and a second automation subgraph;
implement, by the one or more processors, a distributed guest system associated with a data store, the guest system including a first virtual machine coupled to the data store comprising the first automation subgraph and a second virtual machine coupled to the data store comprising the second automation subgraph;
implement, by the one or more processors, a first guest agent on the first virtual machine and a second guest agent on the second virtual machine;
execute, by the one or more processors, a communication between the first guest agent on the first virtual machine and the second guest agent on the second virtual machine; and
execute, by the one or more processors, the first automation subgraph via the first guest agent and the second automation subgraph via the second guest agent in synchronization according to the one or more automated actions via the communication.

2. The system of claim 1,
wherein the first automation subgraph comprises a first automation subgraph action step;
wherein the first automation subgraph action step comprises logic configured to declare a first automation subgraph fatal error;
wherein the first guest agent is configured to sense and handle the first automation subgraph fatal error during execution; and
wherein when the first automation subgraph fatal error is declared, the first guest agent stops the execution of the first automation subgraph.

3. The system of claim 2,
wherein the second automation subgraph comprises a second automation subgraph action step;
wherein the second automation subgraph action step comprises logic configured to declare a second automation subgraph fatal error;
wherein the second guest agent is configured to sense and handle the second automation subgraph fatal error during execution; and
wherein when the second automation subgraph fatal error is declared, second guest agent stops the execution of the second automation subgraph.

4. The system of claim 1,
wherein the first automation subgraph and the second automation subgraph are configured to wait for each other before continuing execution.

5. The system of claim 1,
wherein the first automation subgraph comprises a first action step;
wherein the second automation subgraph comprises a second action step;
wherein the synchronization comprises the first guest agent and the second guest agent communicating with each other an execution state of the first action step and the second action step; and
wherein the first action step executing on the first virtual machine is configured to wait for a signal from the second action step executing on the second virtual machine before continuing execution of the first automation subgraph.

6. A system for managing applications comprising:
one or more computers comprising one or more processors and one or more tangible computer readable media, the one or more tangible computer readable media including instructions stored thereon that when executed cause the one or more computers to:
receive and store in memory user-defined automation actions and causal relationships related to the user-defined automation actions from which an automation graph is derived, the automation graph including a first automation subgraph and a second automation subgraph;
implement, by the one or more processors, a distributed guest system associated with a data store, the guest system including a first virtual machine coupled to the data store comprising the first automation subgraph and a second virtual machine coupled to the data store comprising the second automation subgraph;
implement, by the one or more processors, a first guest agent on the first virtual machine and a second guest agent on the second virtual machine;
execute, by the one or more processors, a communication between the first guest agent and the second guest agent; and
execute, by the one or more processors, the first automation subgraph and the second automation subgraph through the first guest agent and the second guest agent such that the user-defined automation actions are implemented in a synchronized manner through the communication.

7. The system of claim 6,
wherein the distributed guest system comprises a plurality of virtual machines;
wherein each of the plurality of virtual machines comprises a respective guest agent;
wherein each of the plurality of virtual machines comprises a respective automation subgraph associated with each respective guest agent; and
wherein the plurality of virtual machines are configured to communicate with each other while implementing their respective automation subgraphs through their respective guest agent such that automation actions can be implemented in a synchronized manner.

8. The system of claim 7,
wherein each respective automation subgraph comprises a respective graph node; and
wherein each respective graph node only executes a respective automation action when a precursor respective graph node has successfully completed.

9. The system of claim 8,
wherein each respective graph node comprises logic configured to declare a fatal error;
wherein each respective guest agent is configured to sense and handle the fatal error during execution; and
wherein when a fatal error is declared, the respective guest agent stops the execution of the respective automation subgraph.

10. The system of claim 8,
wherein each respective graph node is configured to conditionally pass action messages and no-action messages to downstream graph nodes;
wherein the action messages cause downstream respective graph nodes to execute;
wherein the no-action messages cause downstream respective nodes to skip execution; and
wherein each respective automation subgraph is configured to complete execution, even though some graph nodes did not execute.

11. The system of claim 10,
wherein the downstream respective graph nodes of each respective automation subgraph are configured to react in at least one of two ways:
(1) as a reluctant node where any no-action message will cause the reluctant node to skip execution; or
(2) as an eager node where any action message will cause the eager node to execute.

12. A system for managing applications in a platform implemented on a cloud computing architecture, the cloud computing architecture comprising one or more processors and one or more tangible computer readable media, the one or more tangible computer readable media including instructions stored thereon that when executed cause the platform to:
receive and store in a memory user-defined automation actions and causal relationships related to the user-defined automation actions from which an automation graph is derived, the automation graph including a first automation subgraph and a second automation subgraph;
launch, in response to a request sent over an internet, a guest system comprising at least a first virtual machine having a first guest agent, and a second virtual machine having a second guest agent;
construct, by the one or more processors, the first automation subgraph on the first virtual machine and the second automation subgraph on the second virtual machine; and
configure, by the one or more processors, the first virtual machine and the second virtual machine to communicate with each other on a step-by-step basis to implement the first automation subgraph and the second automation subgraph through the first guest agent and the second guest agent in a synchronized manner.

13. The system of claim 12,
wherein each of respective automation action steps of the first automation subgraph and the second automation subgraph are a graph node; and
wherein each graph node only executes respective one or more automation action steps when a precursor graph node has successfully completed.

14. The system of claim 13,
wherein each graph node comprises logic configured to declare a fatal error;
wherein at least one of the first virtual machine and the second virtual machine are configured to sense and handle the fatal error during execution; and
wherein when a fatal error is declared, at least one of the first virtual machine and the second virtual machine stops the execution of at least one of the first automation subgraph and the second automation subgraph.

15. The system of claim 13,
wherein each graph node is configured to conditionally pass action messages and no-action messages to other graph nodes;
wherein the action messages cause the other graph nodes to execute;
wherein the no-action messages cause the other graph nodes to skip execution; and wherein the first automation subgraph and the second automation subgraph are each configured to complete execution, even though some graph nodes did not execute.

16. The system of claim 15,
wherein each graph node of the first automation subgraph and the second automation subgraph are configured to react in at least one of two ways:
(1) as a reluctant node where any no-action message will cause the reluctant note node to skip execution; or
(2) as an eager node where any action message will cause the eager node to execute.

* * * * *